Dec. 20, 1955 R. G. GREEN 2,728,030

FREQUENCY DIVIDER APPARATUS

Filed Feb. 24, 1953

*INVENTOR.*
ROBERT G. GREEN
*BY* William R. Lane
ATTORNEY

United States Patent Office 2,728,030

Patented Dec. 20, 1955

2,728,030

FREQUENCY DIVIDER APPARATUS

Robert G. Green, Downey, Calif., assignor to North American Aviation, Inc.

Application February 24, 1953, Serial No. 338,468

12 Claims. (Cl. 315—166)

This invention relates to regulating apparatus, and particularly to oscillatory frequency dividers utilizing glow discharge tubes.

In the past, frequency division of a substantially constant frequency signal has been accomplished by the utilization of complicated electronic circuits. In these circuits a voltage is accumulated by the circuit components over a predetermined number of successive input pulses. The stored voltage is then discharged into a tank circuit tuned to the selected subharmonic of the input frequency. A very stable voltage source must be available with this type of frequency divider in order to prevent a serious loss of stability resulting from premature or delayed discharge of the accumulated voltage.

It is therefore an object of this invention to provide an improved regulating apparatus which produces a signal of a predetermined subharmonic of the frequency of an input signal.

It is another object of this invention to provide apparatus which utilizes pulses from a source of input signals to trigger the successive firing of a plurality of neon glow discharge tubes in a continuously recurring sequence and which detects the firing of at least one of the tubes to thereby obtain a predetermined subharmonic of the source frequency.

It is a further object of this invention to provide apparatus which utilizes the pulses from a source of input signal to synchronize the successive firing of an odd numbered plurality of neon glow discharge tubes which normally fire in a recurring sequence at substantially the same frequency as the input signal.

It is another object of this invention to provide an oscillatory device which utilizes the successive firing of a plurality of glow discharge tubes in a recurring sequence to generate a constant frequency signal useful for frequency division.

It is a further object of this invention to provide an oscillatory device which utilizes an RC network and a source of D.-C. potential to successively fire a plurality of glow discharge tubes in a recurring sequence.

Other objects of invention will become apparent from the following description taken in connection with the accompanying drawings, in which Fig. 1 is a schematic drawing of a two-tube oscillatory device contemplated by this invention to generate a constant frequency signal;

Figure 2:
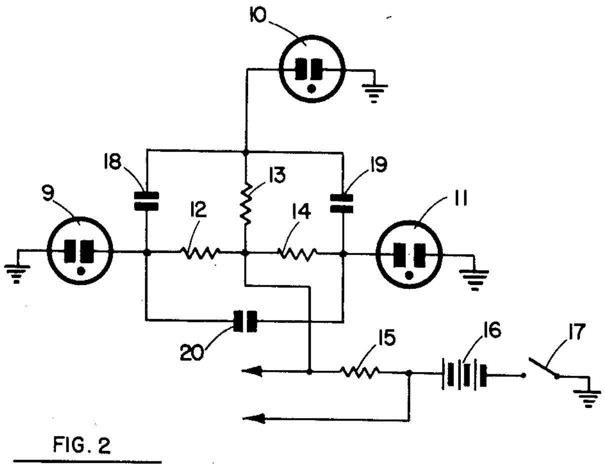
Fig. 2 is a schematic drawing of a three-tube oscillatory device contemplated by this invention to generate a constant frequency signal.
Figure 4:
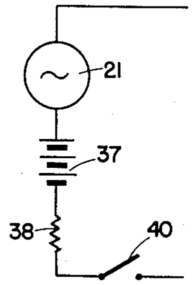

And Fig. 4 is a schematic drawing of a modification of the means for coupling the input signal to the oscillatory circuit of the frequency divider apparatus of Fig. 2.

Figure 1:
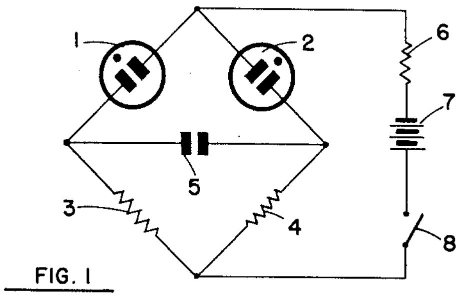

Referring to Fig. 1, the basic oscillatory circuit utilized by this invention for frequency division is shown. This circuit utilizes circuit interrupting means to generate a constant frequency output signal. The circuit interrupting means, as shown by neon glow discharge tubes 1 and 2, breaks the circuit when the current falls below a predetermined cut-off value. The circuit is completed again when a voltage of sufficient magnitude is impressed across the terminal of the interrupting means. Glow discharge tubes are preferably used as the circuit interrupting means utilized by this invention to generate a constant frequency signal having great utility in the field of frequency division. A glow discharge tube fires in a normal glow discharge whenever a voltage of sufficient magnitude is impressed across its terminals. This voltage is generally referred to as the spark voltage of the tube. During the normal glow discharge, the magnitude of the current conducted by the tube can be varied within limits without resulting in a material change in the voltage drop across the tube. As the current conducted through the tube is decreased, however, a value is reached when the current through the tube is no longer sufficient to sustain the glow discharge and the tube extinguishes thereby interrupting the circuit. This value of current is generally referred to as the tube's cut-off current.

Tubes 1 and 2 of Fig. 1 have a normal glow discharge, after being fired, only as long as the external circuitry furnishes sufficient current to sustain the discharge. Tubes 1 and 2 are connected in series with resistors 3 and 4, respectively. The two series paths are connected in parallel across a source of D.-C. potential consisting of resistor 6 connected in series with the D.-C. source 7 and switch 8. Capacitor 5 bridges the paths. Therefore, tubes 1 and 2 are in two adjacent arms of a bridge network with resistors 3 and 4 in the other two adjacent arms. The circuit parameters are selected large enough to limit the current flowing through resistor 3 to tube 1 from the D.-C. source to below the tube's cut-off value. Similarly, the current flowing through resistor 4 to tube 2 is limited to below the tube's cut-off value.

In operation, when switch 8 is closed the full source voltage is instantaneously impressed across tubes 1 and 2. Since this voltage exceeds the spark voltage, one of the tubes fires and, by firing, reduces the voltage across the other tube below its spark voltage. Assume, for purposes of illustration, that tube 1 fires first. It instantaneously draws current from two parallel paths. The first path is through resistor 3, while the second path is through resistor 4 and capacitor 5 connected in series. The current supplied by the second path decreases exponentially in accordance with well-known circuit theory. The reduction of the voltage across tube 2 by the firing of tube 1 is caused by the current flowing through resistor 4 to tube 1. This current causes a voltage drop which opposes the D.-C. source voltage. As explained previously, the current supplied to tube 1 from the series RC path decreases exponentially and the current supplied by resistor 3 alone is not sufficient to sustain the glow discharge of tube 1. Therefore, after a predetermined length of time, the sum of the currents supplied by the two paths falls below the tube's cut-off value and tube 1 is extinguished thereby interrupting the circuit.

When tube 1 ceases to conduct, the charge which has been accumulated on capacitor 5 immediately starts to discharge through resistors 3 and 4. The polarity of the resultant voltage drop across resistor 4 aids the D.-C. source voltage in firing tube 2. The voltage drop across resistor 3 is of a polarity to oppose the D.-C. source voltage and thereby prevents the refiring of tube 1. Tube 2 now draws current from two parallel paths. The first path is through resistor 4, while the second path is through resistor 3 in series with capacitor 5. The current supplied by the second path decreases exponentially and the current supplied through resistor 4 alone is insufficient to sustain the discharge of tube 2, therefore, at some predetermined time, the sum of the two currents falls below the tube's cut-off value and tube 2 extinguishes thereby interrupting the circuit.

The charge on capacitor 5 now prevents the refiring of tube 2 and aids the firing of tube 1. Therefore, the tubes fire alternately as long as switch 8 remains closed. A constant frequency signal output is obtained across resistor 6, if desired. This output is in the form of a pulse each time either tube fires. The frequency of this output is adjustable over a wide range by varying the circuit parameters. For example, varying the size of capacitor 5 thereby changing the time constant of the series RC paths, is a simple way to change the frequency of the oscillatory device of Fig. 1.

Referring now to Fig. 2, a three-tube oscillatory circuit is shown. This circuit utilizes the successive firing of neon glow discharge tubes 9, 10, and 11 in a recurring sequence to generate a constant frequency signal, particularly useful for frequency division. Tubes 9, 10, and 11 are connected in series with resistors 12, 13, and 14, respectively. The three series paths are connected in parallel across a source of D.-C. potential consisting of resistor 15 connected in series with D.-C. source 16 and switch 17. The paths are bridged by a continuous ring of capacitors 18, 19, and 20. Therefore, tubes 9, 10, and 11 are in one group of adjacent arms of a three-sided bridge network while resistors 12, 13, and 14 are in the other group of adjacent arms.

In operation, when switch 17 is closed the full source voltage is instantaneously impressed across each of tubes 9, 10, and 11. One of the tubes fires and thereby prevents the firing of the other two tubes. Assume, for purposes of illustration, that tube 9 fires first. It instantaneously draws current from three parallel paths. The first path is through resistor 12, the second path is through resistor 13 in series with capacitor 18, while the third path is through resistor 14 in series with capacitor 20. The current flowing through resistor 12 to tube 9 is not large enough to sustain the glow discharge of the tube alone. Since the second and third paths are series RC circuits with an exponentially decaying current, a point is reached when the sum of the three currents is no longer sufficient to sustain the flow discharge and tube 9 extinguishes.

Capacitors 18 and 20 immediately begin to discharge through resistors 13 and 12 and resistors 14 and 12, respectively. The polarity of the resulting voltage drop across resistor 12 opposes the source voltage thereby preventing the refiring of tube 9. The polarities of the resulting voltage drops across resistors 13 and 14 aid the source voltage in firing either tube 10 or tube 11. Assume, for purposes of illustration, that tube 10 fires second. By firing, tube 10 prevents the firing of tube 11 by reducing the voltage applied across the tube to a value below the spark voltage. Tube 10 now draws current from three paths. The first path is through resistor 13, the second path is through capacitor 18, while the third path is through capacitor 19. Since the current flowing through the first path alone is insufficient to sustain the glow discharge of tube 10 and the current through the other two paths decays exponentially, a point is reached where the sum of the three currents is no longer sufficient to sustain the discharge and tube 10 extinguishes. The charges on capacitors 18, 19, and 20 are now of such a polarity that when discharging through resistors 12, 13, and 14 they prevent the firing of tubes 9 and 10 and allow tube 11 to fire. The current conducted by tube 11 is supplied by three paths. The first path is to resistor 14, the second path is through capacitor 19, while the third path is through capacitor 20. Since the current flowing through resistor 14 to tube 11 is by design insufficient to sustain the glow discharge of the tube and the currents through the latter two paths decay exponentially, a point is reached when the sum of the three currents is no longer sufficient to sustain the discharge and tube 11 extinguishes.

Once the sequence of firing of the oscillatory circuit of Fig. 2 has been established, the charges remaining on capacitors 18, 19, and 20 at the times of extinguishment of each of tubes 9, 10, and 11 are always of a polarity and magnitude to cause the tubes to fire in the previously established sequence as long as switch 17 remains closed. Thus, in the example described above, the order of firing of the tubes remains 9—10—11—9—10—11 until switch 17 is opened. A pulsed output signal is obtainable across resistor 15, if desired. The frequency of the output signal is determined by the magnitude of the circuit parameters and therefore can be adjusted by changing the values of the resistors, capacitors, or the source of D.-C. voltage. A simple method of adjusting the frequency within limits is to vary the value of resistor 15 or of source 16 of D.-C. voltage.

The oscillatory circuits of Figs. 1 and 2 previously described have great utility in the field of frequency division. By superimposing an alternating input signal on the D.-C. source voltage, the firing of the glow discharge tubes is pulled into synchronism with the input signal. The input signal is coupled into the circuits in a variety of ways well-known in the art, such as the parallel connection of Fig. 3 or the series connection of Fig. 4. The oscillatory circuit is preferably tuned to normally oscillate at a slightly lower frequency than that of the input signal. When the circuits are used for frequency division, the voltage across the bridge circuits is a D.-C. potential with a pulsed A.-C. ripple. The current flowing through the conducting tube also varies in accordance with the A.-C. ripple. Therefore, the negative pulses of the alternating input signal operate to reduce the current supplied to the conducting tube thereby accelerating the extinguishment of the tube. By this means, the extinguishment of the glow discharge tubes, and therefore the subsequent firing of the next tube, is maintained in synchronism with the alternating input signal. By detecting the firing of at least one of the glow discharge tubes either photoelectrically or by a series load impedance, as shown in Fig. 3, a desired subharmonic of the input frequency is obtained.

Figure 3:
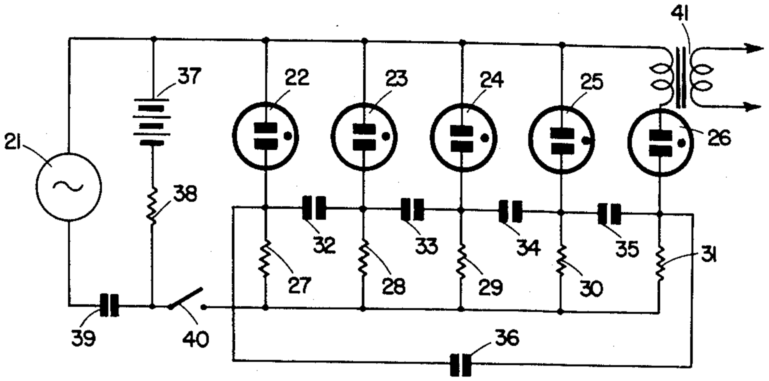
Fig. 3 is a schematic drawing of the preferred embodiment of the frequency divider apparatus contemplated by this invention.

The circuit of Fig. 3 schematically shows apparatus for obtaining the fifth subharmonic of the input signal from source 21. Five glow discharge tubes 22, 23, 24, 25, and 26 are connected in series with the resistors 27, 28, 29, 30, and 31, respectively. The five series paths are connected in parallel across the source of D.-C. potential upon which an alternating signal has been superimposed. A continuous ring of capacitors 32, 33, 34, 35, and 36 bridge the series paths thereby forming a five-sided bridge network. The source of D.-C. potential consists of D.-C. source 37 in series with current limiting resistor 38. Coupling capacitor 39 isolates input signal source 21 from the D.-C. potential. Switch 40 is furnished to energize and de-energize the oscillatory portion of the circuit. The primary of load transformer 41 is connected in series with tube 26. The fifth subharmonic of the input signal is obtained from the secondary of transformer 41. An alternate method of superimposing the alternating input signal on the D.-C. potential is shown in Fig. 4 where input source 21 is connected in series with D.-C. source 37 and resistor 38.

In operation, the five-sided bridge of Fig. 3 operates very similar to the three-sided bridge of Fig. 2 previously described. The tubes of Fig. 3 fire in what is called for convenience a star sequence. That is, if tubes 22, 23, 24, 25, and 26 are considered star-connected to a common terminal with capacitors 32, 33, 34, 35, and 36 connected in a continuous ring around the points of the star, the extinguishment of one of the tubes is always followed by the firing of a tube on the opposite side of the star. Thus, assuming tube 22 fires first, either tube 24 or tube 25 on the other side of the star fires second. If, for purposes of illustration, it is assumed that tube 24 is the second to fire, the sequence is established and is repeated as long as switch 40 remains closed. In the illustration, the sequence of firing is 22—24—26—23—25—22—24, etc. Since the D. C. potential impressed across the bridge has an A. C. ripple, the negative pulses from input source 21 determine the times of extinguishing the tubes. The oscillatory portion of frequency divider apparatus of Fig. 3 is tuned to approximately the same frequency as the input signal. The firing of the tubes is thereby pulled into synchronism with the input signal. Since tube 26 conducts only once during every five input pulses, the output of transformer 41 has a frequency one-fifth the frequency of the input signal.

An oscillatory device can be constructed with any odd number of series paths to form the bridge. Any odd subharmonic of an input signal is readily obtained by adjusting the number of sides in the bridge. Thus, the seventh subharmonic would be obtained by utilizing seven glow discharge tubes in series with seven resistors and with seven capacitors bridging the series paths in a continuous ring. An even subharmonic is obtained by series connecting a two-sided bridge frequency divider with a frequency divider having the appropriate odd number of sides. Thus, the sixth subharmonic is obtained by coupling the output from a two-sided bridge frequency divider as an input to a three-sided frequency divider. The oscillatory portion of the two-sided bridge frequency divider is tuned to approximately the frequency of the input signal, while the oscillatory portion of the three-sided bridge frequency divider is tuned to approximately the second subharmonic of the frequency of the input signal. By detecting the firing of one of the tubes of the latter frequency divider, the sixth subharmonic of the input signal is obtained.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An oscillatory device comprising a source of D. C. potential; at least three means for interrupting a circuit when the current through said interrupting means falls below a predetermined cut-off value; resistor means connected in series with each of said interrupter means, said series circuits being connected in parallel across said source of D. C. potential and said resistors being of sufficient magnitude to limit the current through each of said resistors to below said cut-off value; and a corresponding number of capacitors connected in a closed ring with the terminals between each of said capacitors connected to a corresponding terminal between said interrupting means and said resistors whereby said circuit interrupting means successively make and break their respective circuits in a continuously recurring sequence at a predetermined frequency.

2. An oscillatory device comprising an odd number of glow discharge tubes, a corresponding number of resistors, one of said resistors being connected in series with each of said tubes, a source of D. C. potential having two terminals, means connecting all of said glow discharge tubes to one of said terminals and all of said resistors to the other of said terminals in a manner to form an odd number of series resistor-tube circuits connected in parallel across said source, and a corresponding number of capacitors connected in a closed ring with the connecting terminals between each pair of said capacitors connected to a different connecting terminal between said glow discharge tubes and said resistors whereby said tubes successively fire in a recurring sequence.

3. An oscillatory device useful for frequency division comprising a source of D. C. potential, at least three series resistor-glow discharge tube circuits connected in parallel across said source with all of said glow discharge tubes connected to a common terminal, and a corresponding number of capacitors connected in a closed ring, the terminals between each of said resistors and the corresponding glow discharge tube being connected to a corresponding terminal between two capacitors in said capacitor ring whereby the successive firing in a recurring sequence of glow discharge tubes pulses the current through said source at a predetermined frequency.

4. An oscillatory device useful for frequency division comprising bridge network means having at least three sides, said bridge network means having resistors in one group of adjacent arms, glow discharge tubes in the other group of adjacent arms and a continuous ring of capacitors capacitively bridging the midpoints of the sides of said network, and a source of D. C. potential connected across said bridge network whereby the successive firing in a recurring sequence of glow discharge tubes pulses the current through said source at a predetermined frequency.

5. An oscillatory device useful for frequency division comprising a bridge network with an odd number of sides and having resistors in one group of adjacent arms, glow discharge tubes in the other group of adjacent arms and a corresponding number of capacitors connected in a closed ring with each midpoint of said bridge sides connected to a corresponding terminal between each pair of capictors, and a source of D. C. potential connected across said bridge whereby all of said tubes successively fire in a recurring sequence at a predetermined frequency.

6. An oscillatory device useful for frequency division comprising a source of D.-C. potential, and a bridge network having an odd number of sides connected across said source, said bridge network having glow discharge tubes in one group of adjacent arms, resistors in the other group of adjacent arms, said resistors being of sufficient magnitude to limit the current flowing through any individual resistor from said source to a value below the cut-off current of said tubes, and a corresponding number of capacitors connected in a closed ring with the terminals between each pair of capacitors connected to a corresponding midpoint in said bridge sides whereby all of said tubes successively fire in a recurring sequence at a predetermined frequency.

7. An oscillatory device useful for frequency division comprising an odd number of glow discharge tubes star-connected to a common terminal; a corresponding number of resistors star-connected to a second common terminal; a corresponding number of capacitors connected in a closed ring, each of said glow discharge tubes having its outer terminal connected to an outer terminal of said resistors and to the terminal between two said capacitors; and a D.-C. potential impressed across said two common terminals whereby said glow discharge tubes successively fire in a recurring sequence.

8. Frequency divider comprising a bridge network having at least three sides, said bridge network having resistors in one group of adjacent arms, glow discharge tubes in the other group of adjacent arms, and a corresponding number of capacitors connected in a closed ring with the terminals between each pair of capacitors connected to a corresponding midpoint in the sides of said bridge network; a source of D.-C. potential connected across said bridge network; means superimposing an alternating input signal on said D.-C. potential; and detector means sensitive to the firing of one of said tubes whereby the output of said detector means is a subharmonic of the frequency of said input signal.

9. Frequency divider apparatus for obtaining an odd subharmonic of an input signal comprising a bridge network having an odd number of sides and having resistors in one group of adjacent arms, glow discharge tubes in the other group of adjacent arms, and a corresponding number of capacitors connected in a closed ring with the terminals between each pair of capacitors connected to the corresponding midpoint in bridge network; a source of D.-C. potential connected across said bridge; means coupling said alternating input signal to said D.-C. source in a manner to superimpose said alternating signal on D.-C. potential; and detector means sensitive to the firing of one of said glow discharge tubes whereby the output of said detector means is the odd subharmonic of the frequency of said input signal.

10. Frequency divider apparatus for obtaining an odd subharmonic of an alternating input signal comprising a source of D.-C. potential; a bridge network having an odd number of sides connected across said source, said bridge network having glow discharge tubes in one group of adjacent arms, resistors in the other group of adjacent arms, said resistors being of sufficient magnitude to limit the current flowing through any individual resistor from said source to a value below the cut-off current of said tubes, and a corresponding number of capacitors connected in a closed ring with the terminals between each pair of capacitors connected to a corresponding midpoint in the sides of said bridge network; means superimposing said alternating input signal on said D.-C. potential; and detector means sensitive to the discharge of one of said glow discharge tubes whereby the output of said detector means is the odd subharmonic of said alternating input signal.

11. Frequency divider apparatus comprising a source of D.-C. potential modulated by an alternating input signal and having two terminals; an odd number of resistors star-connected to one of said terminals; a corresponding number of glow discharge tubes star-connected to the other of said terminals, a corresponding number of capacitors connected in a closed ring, the free end of each of said tubes being connected to a corresponding free end of one of said resistors and to the terminal between two of said capacitors; and detector means sensitive to the firing of at least one of said tubes whereby the output of said detector means is a subharmonic of the frequency of said input signal.

12. Frequency divider apparatus for obtaining a subharmonic of an input signal comprising a source of D.-C. potential; modulating means superimposing said input signal on said D.-C. potential; an odd number of resistors star-connected to a common terminal; a plurality of capacitors connecting the outer terminals of said resistors in a continuous ring; a glow discharge tube connected to the outer terminal of each star-connected resistor, the other ends of said tubes being star-connected to a second common terminal, said first and second common terminals being subjected to said modulated D.-C. potential; and detector means sensitive to the firing of one of said tubes whereby the output of said detector means is a frequency which is a subharmonic of said input signal.

References Cited in the file of this patent

UNITED STATES PATENTS

| | | |
|---|---|---|
| 2,247,728 | Langer | July 1, 1941 |
| 2,310,328 | Swift | Feb. 9, 1943 |
| 2,541,041 | Crenshaw | Feb. 13, 1951 |

OTHER REFERENCES

"A Timed RC Circuit" by John P. German, Electronic Engineering, October 1952, p. 461. (Copy in Div. 54.)